Figure 1:
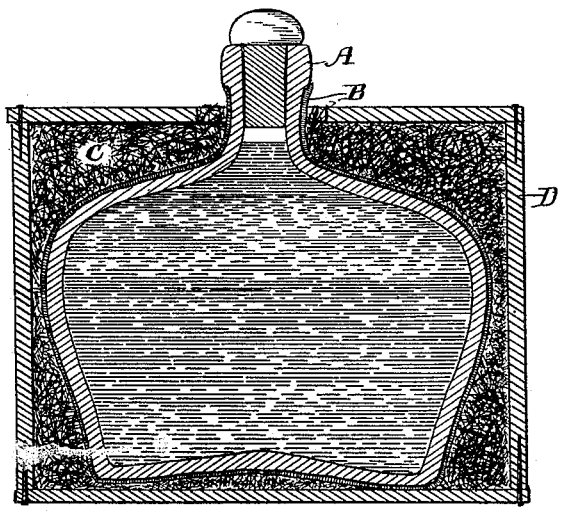

(No Model.)

T. J. MAYALL.
COVERING HOLLOW VESSELS WITH VULCANIZED RUBBER COMPOSITIONS.

No. 247,837. Patented Oct. 4, 1881.

Witnesses:
H. Kenney Jr.
H. E. Renwick

Inventor:
Th. J. Mayall

UNITED STATES PATENT OFFICE.

THOMAS J. MAYALL, OF READING, MASSACHUSETTS.

COVERING HOLLOW VESSELS WITH VULCANIZED-RUBBER COMPOSITION.

SPECIFICATION forming part of Letters Patent No. 247,837, dated October 4, 1881.

Application filed May 7, 1881. (No model.)

*To all whom it may concern:*

Be it known that I, THOMAS J. MAYALL, of Reading, in the county of Middlesex and State of Massachusetts, have invented a new and useful Improvement in Covering Hollow Vessels used to hold Fluids to Protect them from Breakage, of which the following is a specification.

My invention has more particular reference to the covering and protection from breakage of vessels made of glass and other brittle substances, and is specially applicable to vessels used to transport strong and corrosive acids and caustic alkaline solutions.

It consists in an article or vessel made of fragile material—such as glass—completely surrounded and protected by a layer or coating of a tough and durable material—such as a compound of rubber, graphite, and sulphur—applied in the manner hereinafter described.

To put my invention in practice I take of pure rubber, one part; of graphite, (according to the quality of the covering desired,) one to three parts, by weight, and enough of sulphur to aid in the curing or vulcanizing, and thoroughly commingle or blend them together by grinding or any other suitable means, forming a plastic mass. This plastic compound I apply to the vessels to be covered and protected by it, laying on a coating of thickness sufficient for the purpose, and then cure the compound by heat, or, as the usual expression is, "vulcanize" it, until it attains the degree of hardness required, which will generally be of the consistency of good leather, or about that. In some cases it may be necessary or desirable to make the compound harder, like hard rubber.

The most convenient way of applying this rubber and graphite compound to the surface of vessels is to run the plastic mass out into sheets of proper thickness, and then cut out by patterns pieces which when applied will exactly cover the vessel, the edges of the pieces meeting together, so as to leave no space between them. The surface of the vessel should be painted over with a semi-fluid solution of the same compound, so that the sheet will readily adhere to all parts of the surface.

If desirable, a handle may be molded from the plastic mass and affixed to the vessel where it will be most convenient for use. The whole is then exposed to the action of heat and cured. The covering will have a degree of elasticity and pliability best calculated to protect glass or other brittle material incased in it from danger of fracture by percussion or violent collision with hard objects. It is a tight vessel of itself, and will securely hold any fluid, even if the glass or other material of the vessel should be broken, and it will resist corrosive action of the strongest nitric and other acids. Applied to acid-carboys in the manner described it forms a sufficient protection against the ordinary risk of breakage, and if by mischance the carboy is broken, the acid cannot escape.

Glass cans for distributing milk and transporting and delivering oysters may be made as durable and reliable as vessels of metal or wood, and much easier to keep clean and sweet.

Figure 2:
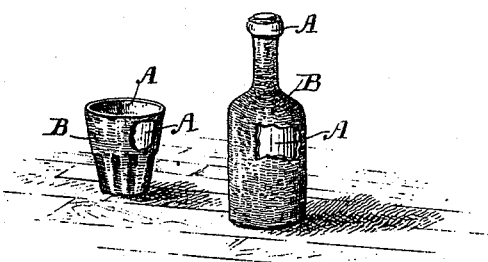

In the accompanying drawings, which form a part of this specification, Figure 1 is a sectional view of a vessel or carboy, such as is used for transporting acids; and Fig. 2 illustrates two forms of vessels, all embodying the invention.

A is the vessel of glass or similar material, and B the covering or coating of the rubber and graphite compound.

In Fig. 1 the vessel or carboy is shown packed in a box, D, with a packing, C, of straw or other material, in the customary manner.

I claim as new and my invention—

As a new article of manufacture, a vessel of glass or similar material having a continuous coating of a tough and durable material, such as a compound of rubber, graphite, and sulphur, substantially as described.

THOS. J. MAYALL.

Witnesses:
 CHS. HOUGHTON,
 H. KENNEY, Jr.